United States Patent [19]
Johnson

[11] Patent Number: 5,264,761
[45] Date of Patent: Nov. 23, 1993

[54] PROGRAMMED CONTROL MODULE FOR INDUCTIVE COUPLING TO A WALL SWITCH

[75] Inventor: Samuel A. Johnson, Eagle, Id.

[73] Assignee: Beacon Light Products, Inc., Meridian, Id.

[21] Appl. No.: 758,731

[22] Filed: Sep. 12, 1991

[51] Int. Cl.$^5$ ............................................. H01J 7/44
[52] U.S. Cl. ............................. 315/291; 315/194; 315/199; 323/300; 323/320
[58] Field of Search ............... 315/194, 199, 291, 276, 315/360, DIG. 4; 323/217, 300, 320, 322

[56] References Cited

U.S. PATENT DOCUMENTS

| | | | |
|---|---|---|---|
| Re. 31,848 | 3/1985 | Nilssen | 315/360 |
| 3,684,919 | 8/1972 | Cramer | 315/194 |
| 3,952,242 | 4/1976 | Ukai | 315/194 X |
| 4,118,654 | 10/1978 | Ohta et al. | 315/194 X |
| 4,259,619 | 3/1981 | Wall | 315/199 X |
| 4,804,916 | 2/1989 | Frank | 323/300 |
| 4,928,055 | 5/1990 | Kaieda et al. | 323/300 |
| 5,030,890 | 7/1991 | Johnson | 315/208 |
| 5,126,634 | 6/1992 | Johnson | 315/71 |

Primary Examiner—Eugene R. LaRoche
Assistant Examiner—Do Hyun Yoo
Attorney, Agent, or Firm—William J. Bethurum

[57] ABSTRACT

A lamp control module including a housing having a receptacle therein with a transformer winding wound around the inner walls of the receptacle in being operatively driven by a programmed microprocessor. The transformer winding of the module is further operative to be inductively coupled to a second transformer winding which is located within an on-off switch knob of a wall switch panel, and the second transformer winding is further connected to the gate electrode of an AC switch. Pulses which are generated in the lamp control module and controlled by data values stored in the microprocessor therein are transformer coupled from the housing receptacle transformer winding into the knob switch transformer and then to the gate electrode of the AC switch. These pulses are operative to control the phase angle and conduction time of the Triac and in turn control the conduction time that an AC voltage is applied from an external AC voltage source to a lamp.

21 Claims, 9 Drawing Sheets

PROGRAMMED CONTROL MODULE FOR INDUCTIVE COUPLING TO A WALL SWITCH

TECHNICAL FIELD

This invention relates generally lighting control circuitry useful for controlling various lighting functions such as timing, dimming, lamp illumination intensity, on-off duty cycle and the like. More particularly, this invention is directed to such control circuitry employing a pulse transformer inductively coupled between an electrical power control circuit inside a wall switch and a programmed pulse control module which is removably attachable to the outside panel of the wall switch.

BACKGROUND ART

Many control circuit designs have been developed in recent years which are directed to controlling the various above described lighting functions by making certain manual control adjustments for and connections to a wall switch used to supply an energizing AC supply voltage to a lamp. One such circuit design is disclosed, for example, in U.S. Pat. No. Re. 31,848 issued to Ole K. Nilssen on Mar. 12, 1985 and entitled "Electronic Assembly".

One of the several disadvantages of the operation of the electrical control assembly disclosed in the above Nilssen reissue patent is that the wall switch which controls the AC power to the lamp must be disassembled by removing the switch panel and then hard wired directly to the electronic module disclosed in the Nilssen patent and then reassembled and the wall switch panel therefor replaced. Not only is this procedure rather tedious and time consuming, but the person making the above module attachment is exposed to the hazardous 120 volt AC terminals within the wall switch each time the Nilssen electronic module assembly is wired into the wall switch. Moreover, the above type of electrical attachment procedure means that a single module cannot be practically and conveniently moved from wall switch to wall switch within a home or office and that, as a practical matter, one would probably wind up purchasing as many of these electronic control assembly modules disclosed by Nilssen as there are separate wall switches and connected lamps to be controlled.

RELATED PATENT AND APPLICATION

One novel approach which is directed to simplifying lighting control with respect to the relatively complicated, tedious, expensive, and perhaps dangerous assembly and reassembly procedures used above for the Nilssen electronic assembly is disclosed and claimed in my U.S. Pat. No. 5,030,890, issued Jul. 9, 1991, entitled "Two Terminal Incandescent Lamp Controller". This patent discloses, among other things, a small control module about the diameter of a quarter which may be mounted in a lamp socket and positioned between the screw shell base of an incandescent lamp bulb and the center end terminal of a receiving lamp bulb socket. This small self-contained module includes a gate-controlled Triac and a programmed microprocessor therein which responds to the timing and sequence of on-off switching of a connected wall switch to in turn provide phase controlled signals to the gate of the Triac. These phase controlled signals in turn control the conduction time of the Triac and the conduction angle that the AC supply voltage is applied to the incandescent lamp bulb each 360° cycle of applied AC voltage. In this manner, parameters of incandescent lamp illumination intensity, timing, duty cycle control, and the like may be advantageously controlled by certain data values stored or preprogrammed into the microprocessor of the small control module and selected by the manual on-off operation of a wall switch.

The novel approach to incandescent lamp control as disclosed and claimed in my above identified U.S. Pat. No. 5,030,890 has been further expanded to cover the integration of yet a smaller self-contained module into the screw shell base of the incandescent lamp bulb. This novel expanded approach to incandescent lamp bulb control is disclosed and claimed in my co-pending application Ser. No. 07/587,997 entitled "Lamp Bulb With Integrated Bulb Control Circuitry and Method of Operation", filed Sep. 25, 1990. In this copending application, the control module is smaller in diameter than a dime and is integrated directly into the small end terminal of the incandescent lamp bulb. This new and improved control module includes lighting control electronics similar to those employed in my earlier issued U.S. Pat. No. 5,030,890.

DISCLOSURE OF INVENTION

The general purpose and principal object of the present invention is to provide still further new and useful improvements in the art and technology of incandescent lamp bulb control of the type described above. These improvements have been conceived and developed to overcome many of the above described significant disadvantages of using and operating an electronic control assembly of the type disclosed in Nilssen's Reissue U.S. No. Re. 31,848.

Another object of this invention is to provide new, improved and expanded incandescent lamp bulb control circuitry with respect to my own two patentable inventions identified above.

Another object of this invention is to provide a new and improved lighting control system and associated control module of the type described which is operative to provide multiple lighting function controls of an incandescent lamp without requiring the costly and tedious disassembly and reassembly of a wall switch and associated panel each time preprogrammed electronic control signals are to be provided therefor.

Another object of this invention is to provide a new and improved lamp control system and module of the type described which is relatively economical in construction and reliable in operation.

Another object of this invention is to provide a new and improved lighting control system and electronic module of the type described which may be readily and conveniently used with a plurality of different wall switches within a home or office without requiring the disassembly and reassembly of any of these wall switches during multiple switch use and without the operator of these switches being exposed to the 120 volt AC power supply terminals within these wall switches.

Another object of this invention is to provide a new and improved load control system of the type described which is operative by inductive coupling to a conventional wall plug to control peak load demands as seen by the providing utility company so that selected loads can be turned off to prevent power "brown-outs" during certain hours of the day.

The above objects and many attendant advantages and novel features of this invention are achieved by the provision of a data link switching system for controlling the phase angle of an AC voltage applied to an incandescent lamp, or generally transmitting data between a programming and receiving module. This system includes, in combination:

a. a programmable module including pulse generation means therein responsive to stored data values for generating timed output pulses, and b. phase control means transformer coupled to receive said timed output pulses from said pulse generating means for controlling the conduction angle of each 360° AC waveform applied to the lamp, or to control programmed on/off events.

A novel feature of this invention is the provision of a programmable module and housing therefor including a first transformer winding wound around an inner wall of the housing and being operatively driven by a programmed microprocessor. The first or transformer primary winding of the programmed control module is operative to be inductively coupled through the knob of a wall switch panel to a second or transformer secondary winding which is located within the on-off wall switch knob. The second transformer winding is further connected to the gate electrode of an AC switch, such as a semiconductor Triac. Pulses generated in the programmable control module and controlled by data values stored in the microprocessor are transformer coupled from the control module housing and into the knob switch secondary transformer winding and then to the gate electrode of the Triac to thereby control the phase angle and conduction time of the Triac and thus the phase angle of the AC voltage applied to a lamp connected in series with the Triac.

Another feature of this invention is the provision of novel fixed power module control circuitry which includes a secondary transformer winding connected between the gate an output electrodes of a Triac and is operative to be connected and disconnected to the Triac by the appropriate movement of a conventional wall switch knob to a certain position.

Another feature of this invention is the provision of the transformer secondary winding by locating a small radio frequency choke within the interior of the wall switch knob.

Another feature of this invention is the provision of a second microprocessor connected between the transformer secondary winding and the gate electrode of the Triac for downloading data into the fixed power module from the removable control module received by the wall switch knob.

Another feature of this invention is the retention of standard face plates which often are color and style coordinated through the home or office.

Another feature of this invention resides in the ability to manually use the wall switch as a regular on-off wall switch by simply removing the programmable module therefrom and toggling the switch knob.

Another feature of this invention is the ability of the switching operation described herein to provide true zero cross switching using a low cost thyristor with only a two wire device to eliminate the need for a third wire, a relay, and/or radio interference control devices.

Figure 7A:
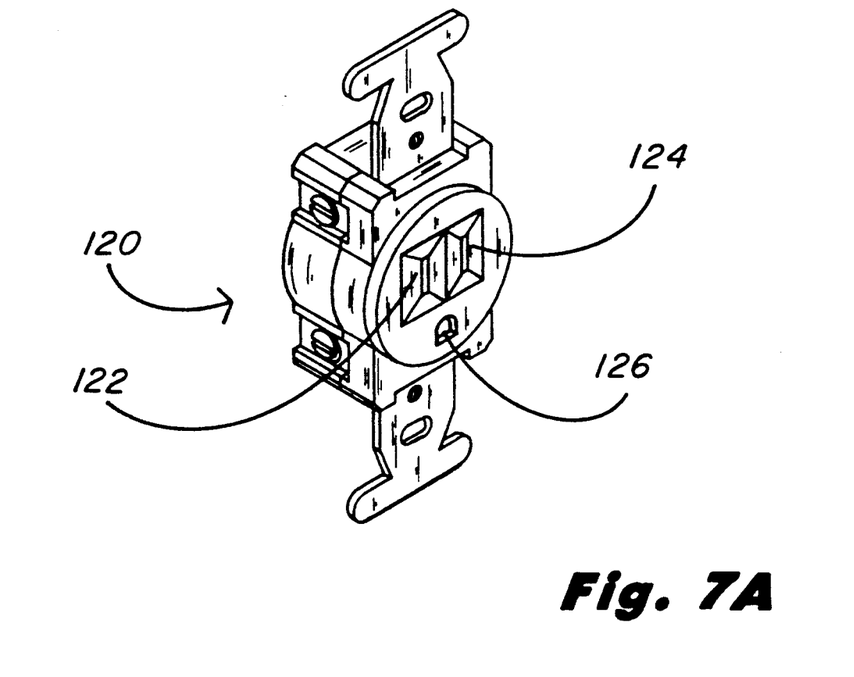
FIGS. 7A through 7C are isometric and cut-away views illustrating a further embodiment of the invention which is used in the programming of a conventional wall plug equipped with the fixed power module shown in FIG. 4B.
Figure 7B:
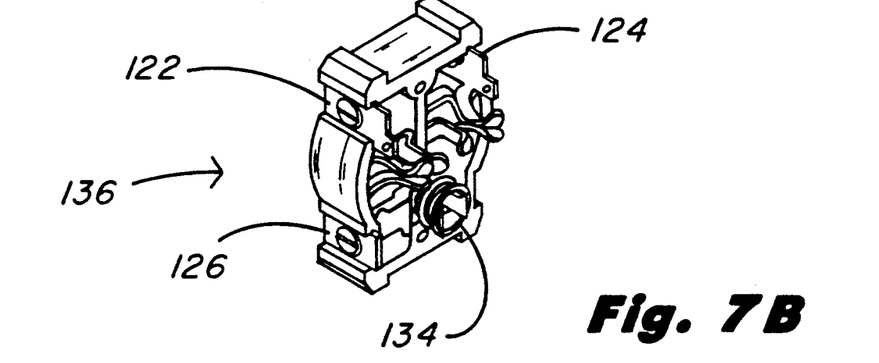
Figure 7C:
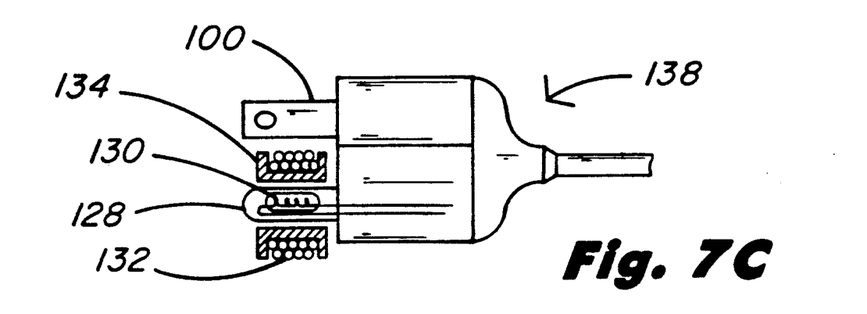

Another feature of this invention is the provision of a novel microprocessor controlled and inductively coupled wall plug interconnect scheme whereby a conventional wall switch is first equipped with a microprocessor-controlled Triac and then inductively coupled to a conventional plug-in fixture in such a manner that load control data may be inductively down-loaded into the microprocessor for controlling the conduction time of the Triac. Using this approach, certain household power demands or the like can be reduced during certain peak hours of the day. This interconnect scheme is illustrated in FIGS. 7A through 7C herein.

The above brief summary of the invention, together with its objects, novel features, and related advantages will become better understood with reference to the following description of the accompanying drawings.

DETAILED DESCRIPTION OF THE PREFERRED EMBODIMENT

Figure 1A:
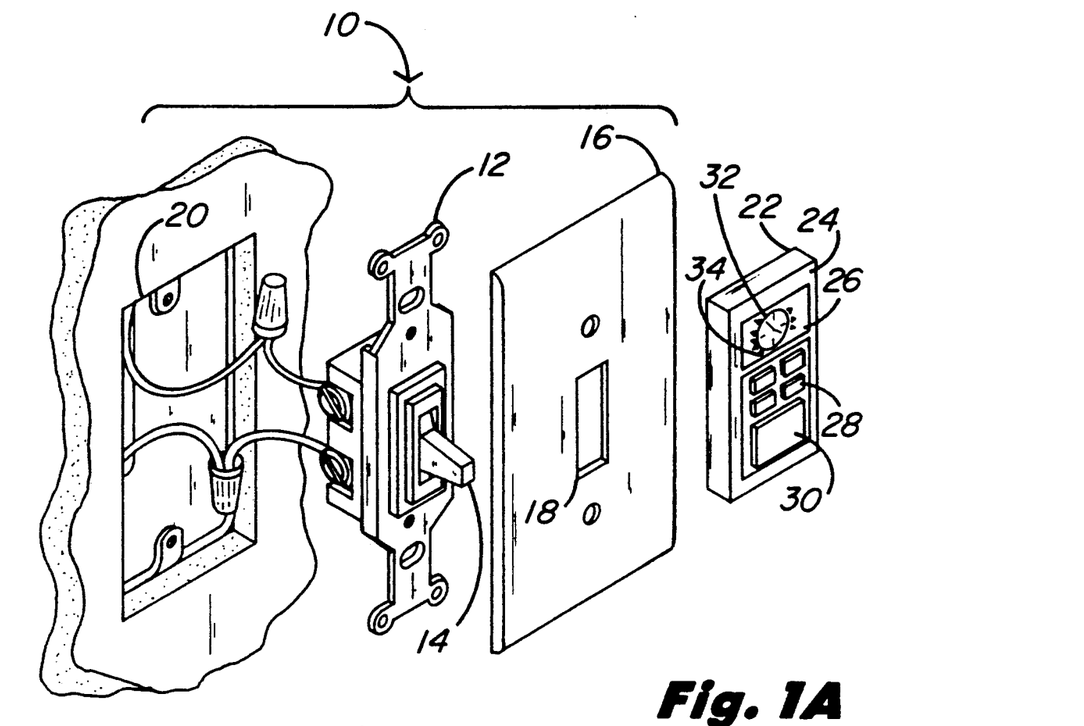
FIG. 1A is an exploded isometric view showing how the small programmed module to the right of the wall switch panel is adapted to be received by a conventional looking light switch knob positioned in this figure on the left hand side of the wall switch panel.

Referring now to FIG. 1A, there is shown a conventional looking home or office wall switch designated generally as 10, and it includes a main switch device 12 including an on/off manual control knob 14 adapted to receive a face plate or panel 16 in the normal manner. The face plate 16 has a rectangular opening 18 therein for receiving the on/off switch knob 14, and the switch 12 and the panel 16 are mounted in a conventional fashion in a wall receptacle 20. When assembled as described above, the switch knob 14 has an up or on position, a down or off position, and a third approximately horizontal position at which the switch knob 14 is adapted to receive and be transformer coupled to a programmable control module 22.

The control module 22 includes therein, among other things, a microprocessor which is connected to drive a pulse generator in a manner described below with reference to FIGS. 4A and 4B. The pulse generator in turn drives the primary winding of an output transformer also in a manner to be described in detail below with reference to FIGS. 4A and 4B. The programmable control module 22 is provided with an outer housing having a control panel 24 thereon which includes an analog or digital display section 26, a plurality of small push button switches 28 and a large lower push button switch 30 all positioned in the configuration shown and connected to a small printed circuit board within the module housing as described in FIG. 1C below. The display section 26 of the display panel 24 includes an analog or digital clock 32 around the periphery of which are positioned liquid crystal display elements 34 which are used to provide a visual indication of the module preset timing cycles and the like which are then programmed into the module 22.

Figure 1B:
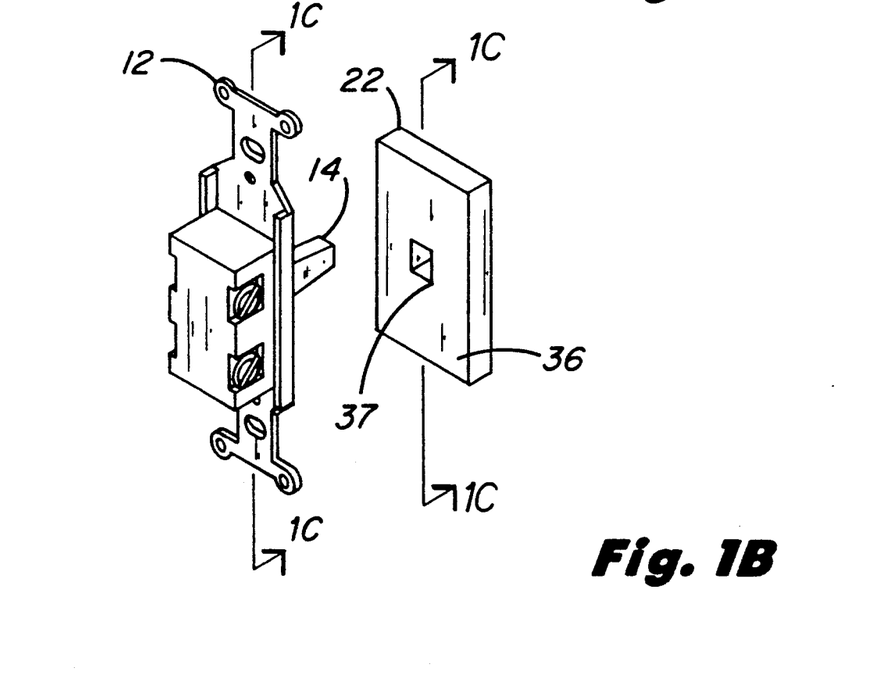
FIG. 1B is an isometric view of a lamp wall switch and control module in a reversed orientation to illustrate the shape of the receptacle or recessed cavity in the back side of the control module which is configured to snap-on and pressfit with the protruding knob of the wall switch, thus holding the control module in position for use.

Referring now to FIG. 1B, the reverse face 36 of the control module 22 includes a receptacle 37 therein having a configuration which matches the outer configuration of the switch knob 14. The receptacle 37 is adapted to receive therein the switch knob 14 in a firm press fit or snap on connection which allows the module 22 to be easily moved from wall switch to wall switch within a home or office. As is described in more detail below, the primary output transformer winding of the control module 22 is wound around the interior walls of the module 22 which define the receptacle 37. In operation, this primary transformer winding will be transformer coupled to a small secondary transformer winding, such as an RF choke, located within the interior of the switch knob 14. This transformer is operative for bidirectionally passing data back and forth between the control module 22 and the wall switch 10 in order to enable a number of incandescent lamp control functions to be carried out and selectively programmed into the control module 22.

Figure 1C:
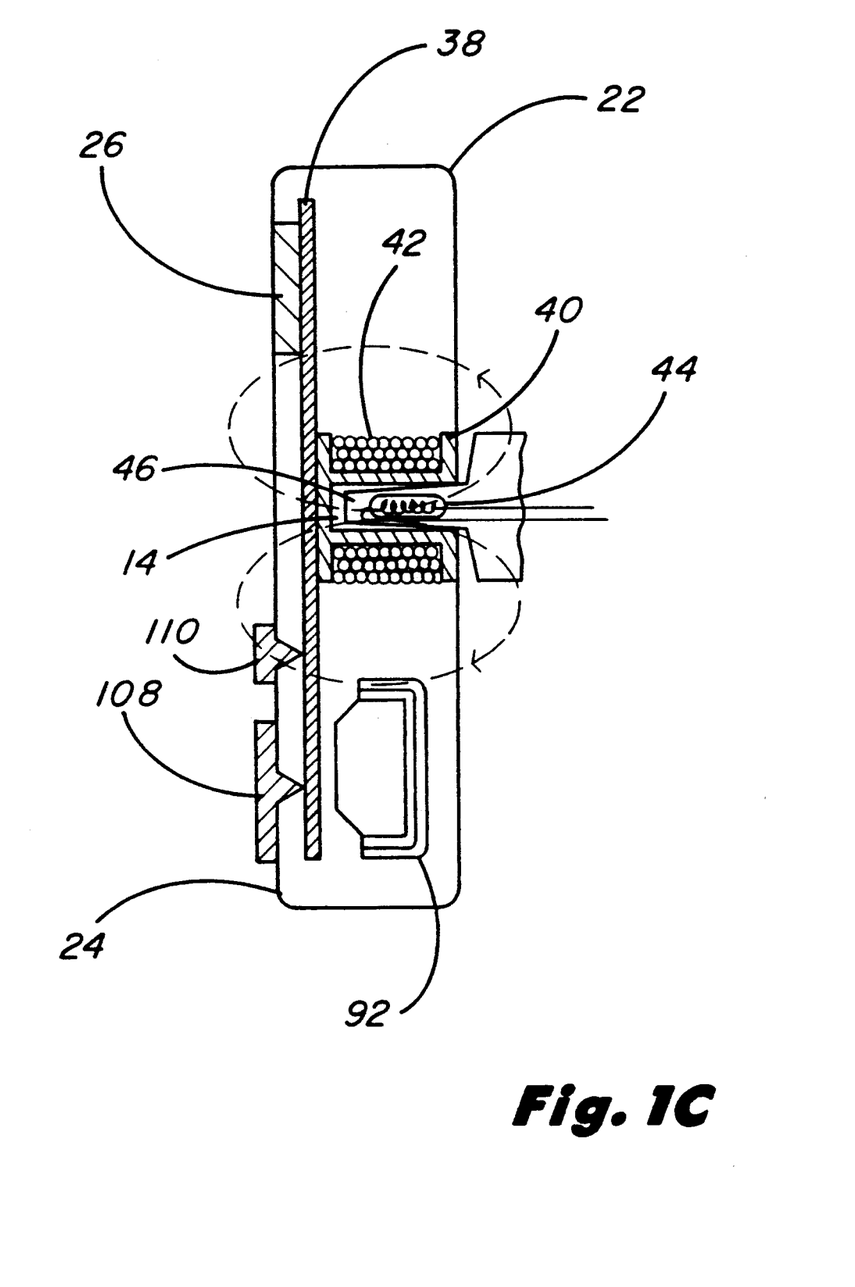
FIG. 1C is a cross-section view taken along lines C—C and D—D of FIG. 1B and down through the center of the switch knob and mating receptacle shown in FIG. 1B in order to illustrate the novel transformer coupling between these two devices.

Referring now to FIG. 1C, the control module 22 shown in cross-sectional view therein includes typically a printed circuit board or card 38 which is electrically interconnected to the analog or digital display panel 106 and also to the small and large push buttons 108, 110, 112, 114, and 116 in the lower section of the front panel 24. A hollow plastic or ferrite magnetic core member 40 which is configured generally in the shape of a bobbin with a hollowed out interior which corresponds to the receptacle 37 as shown in FIG. 1B above. This core member 40 is bonded to the back side of the printed circuit board 38 and is wound on its exterior surface with the primary transformer winding for the pulse transformer which forms part of the control module output circuitry (shown in FIGS. 4A and 4B below). This circuitry has been fabricated on the right hand side of the printed circuit board 38 using known state of the art printed circuit board fabrication techniques.

Advantageously, the secondary winding of the pulse transformer may be a small inexpensive radio frequency (RF) choke coil 44 which is positioned as shown in the hollowed out interior section 46 of the switch knob 14.

Figure 2A:
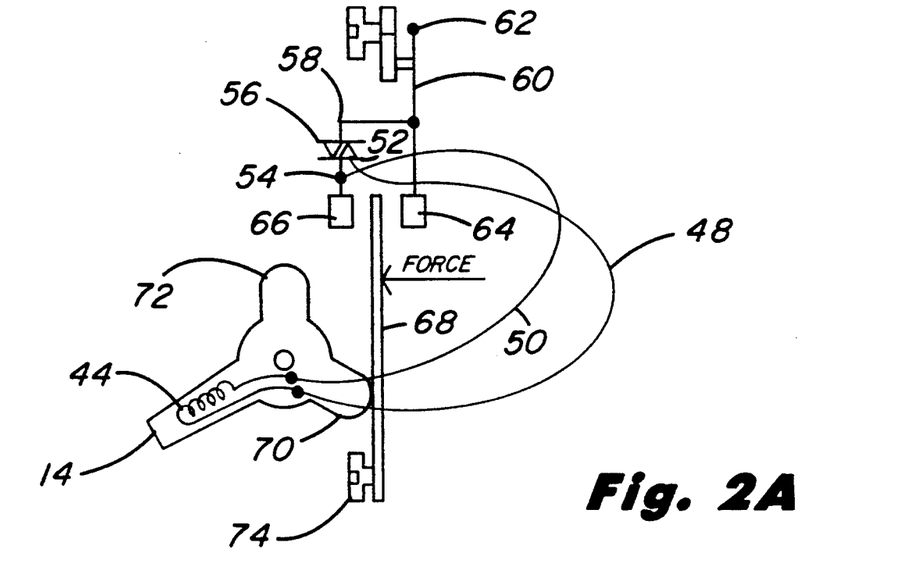
FIG. 2A is a schematic diagram illustrating the down or off position of the switch knob in FIGS. 1A-1C above where the semiconductor Triac shown is disconnected from the circuit.
Figure 2B:
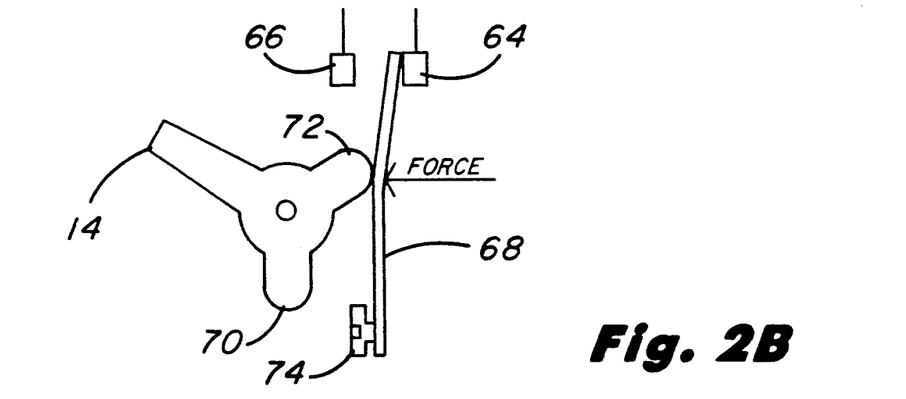
FIG. 2B is a schematic diagram illustrating the up or on position of the switch knob in FIGS. 1A-1C above with the AC source voltage being applied directly through the switch to a lamp or other load connected thereto.
Figure 2C:
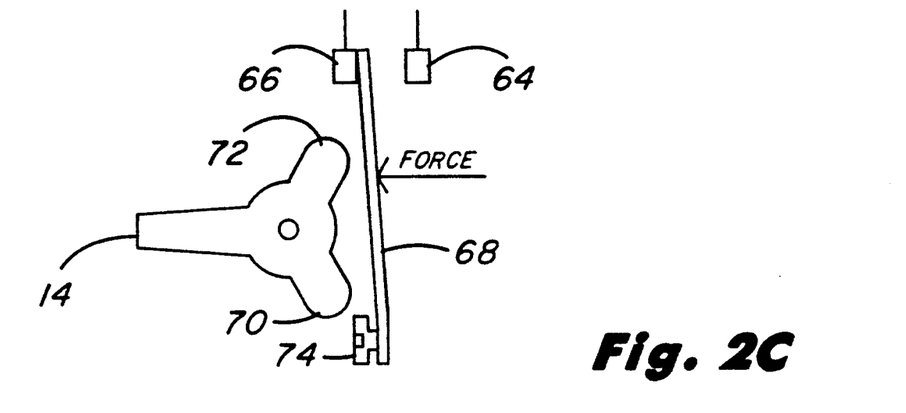
FIG. 2C is a schematic diagram which shows the wall switch knob in an approximate horizontal position for receiving the programmable control module and further wherein the Triac is actively connected in the wall switch circuit. In this position, the Triac is operative to be phase controlled by pulses transformer coupled thereto from the electronic control module.

Referring now in sequence to FIGS. 2A, 2B, and 2C, the small RF choke 44 seen in FIG. 2A is in the off or down position of the wall switch is connected by wires or conductors 48 and 50 to the gate and output electrodes 52 and 54, respectively, of a semiconductor Triac 56. The other output electrode 58 of the Triac 56 is connected by way of conductor 60 to one side 62 of the AC line, and the conductor 60 and the other Triac output electrode 54 are further connected as shown to a pair of relay type contacts 64 and 66 between which a cantilever switch 68 is positioned as shown. In the down or off position of the switch as shown in FIG. 2A, a lower cam member 70 of the switch 14 biases the spring loaded cantilever switch member 68 to the upright vertical position as shown in FIG. 2A, so that the AC line voltage at terminal 62 is totally disconnected from the load. This is a positive "off" condition corresponding to the off position of a normal single pole-single throw (SPST) wall switch.

When the wall switch knob 14 is then moved to its up or on position as shown in FIG. 2B, the upper cam member 72 of the switch now moves into contact with the spring loaded cantilever switch member 68 to drive it into electrical contact with the relay contact 64 to thereby directly connect the AC line voltage at terminal 62 across a selected load such as an incandescent lamp. This is a positive "on" condition and corresponds to the normally "on" position of a standard wall switch.

Referring now to FIG. 2C, when the knob 14 of the switch is moved to its third or approximately horizontal position as shown, both of the lower and upper cam members 70 and 72 of the switch move out of contact with the cantilever switch member 68. This action enables the left to right spring bias applied to the cantilever switch member 68 to drive this switch member into electrical contact with the relay contact pad 66 at the output terminal 54 of the semiconductor Triac 56, thereby now directly connecting the Triac 56 in series with the load to be controlled.

Since the Triac is normally off at the application of initial power across its main terminals 54 and 58, the load will remain off when the switch 14 is at its mid position indicated in FIG. 2C. Only the application of a current pulse applied across Triac gate 48 and the Triac main terminal 54 can turn the Triac on and conduct current through the load. Since the types of loads switches are all alternating current, the Triac will turn off at each zero crossing 37 shown in FIG. 3. Also shown in FIG. 3 are the Triac gating pulses 34, and these gating pulses 34 are supplied by the transformer secondary winding 44 of FIG. 4A, the 60 Hertz AC line voltage 36 and the conducted current component 35 which flows through the Triac and the load until the next zero crossing 37 occurs, whereupon the Triac turns off and current to the load ceases until the next Triac gate pulse 34 occurs.

Figure 3:
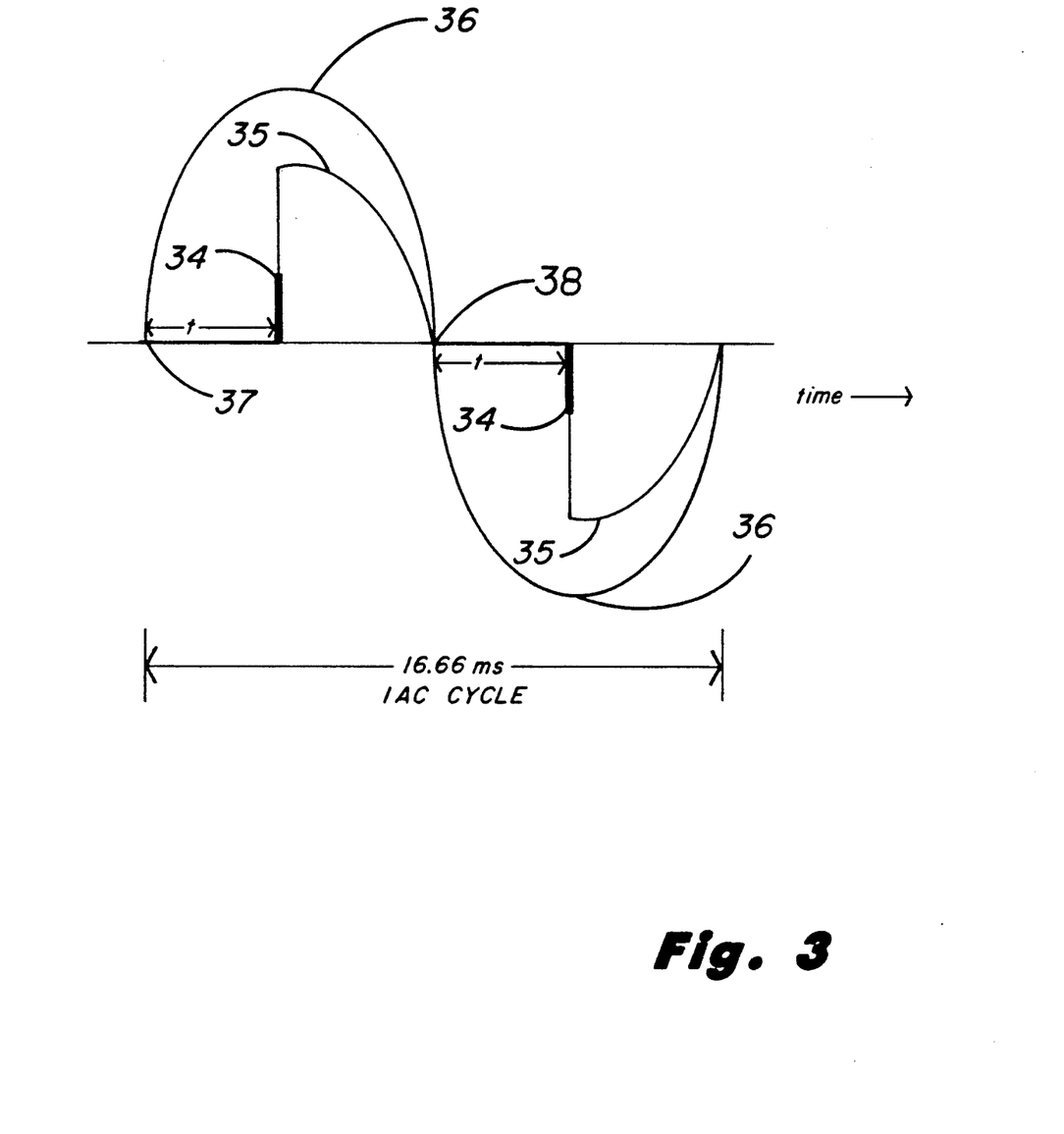
FIG. 3 is a waveform diagram showing the timing of the Triac firing in relation to AC line voltage.

An extremely advantageous feature of this design is that the pulses 34 can be timed to occur at the AC zero crossing of the line voltage to completely eliminate radio frequency interference (RFI) associated with other designs which must draw their operating power from a delayed Triac firing with respect to the zero crossings 37 and 38 shown in FIG. 3. This feature is made possible by the control module 22 being battery operated, and being electrically self-contained, since it is immune to load power level interactions and limitations. As an example, a single three volt lithium type battery will provide enough power to last two years of normal operating time for this control module, with the majority of the power budget being the generation of Triac gating pulses applied to the transformer primary winding 42.

Therefore, with the secondary transformer winding 44 of the fixed power module 12 now connected directly between the gate and output electrodes 52 and 54 of the semiconductor Triac 56, a load such as an incandescent lamp connected in series with the AC line voltage terminals 62 and 74 will only be energized on that fraction or conduction angle of the 360° AC waveform after the Triac 56 is driven to conduction by current flowing in the secondary winding 44 of the output pulse transformer of the control module 22.

Figure 4A:
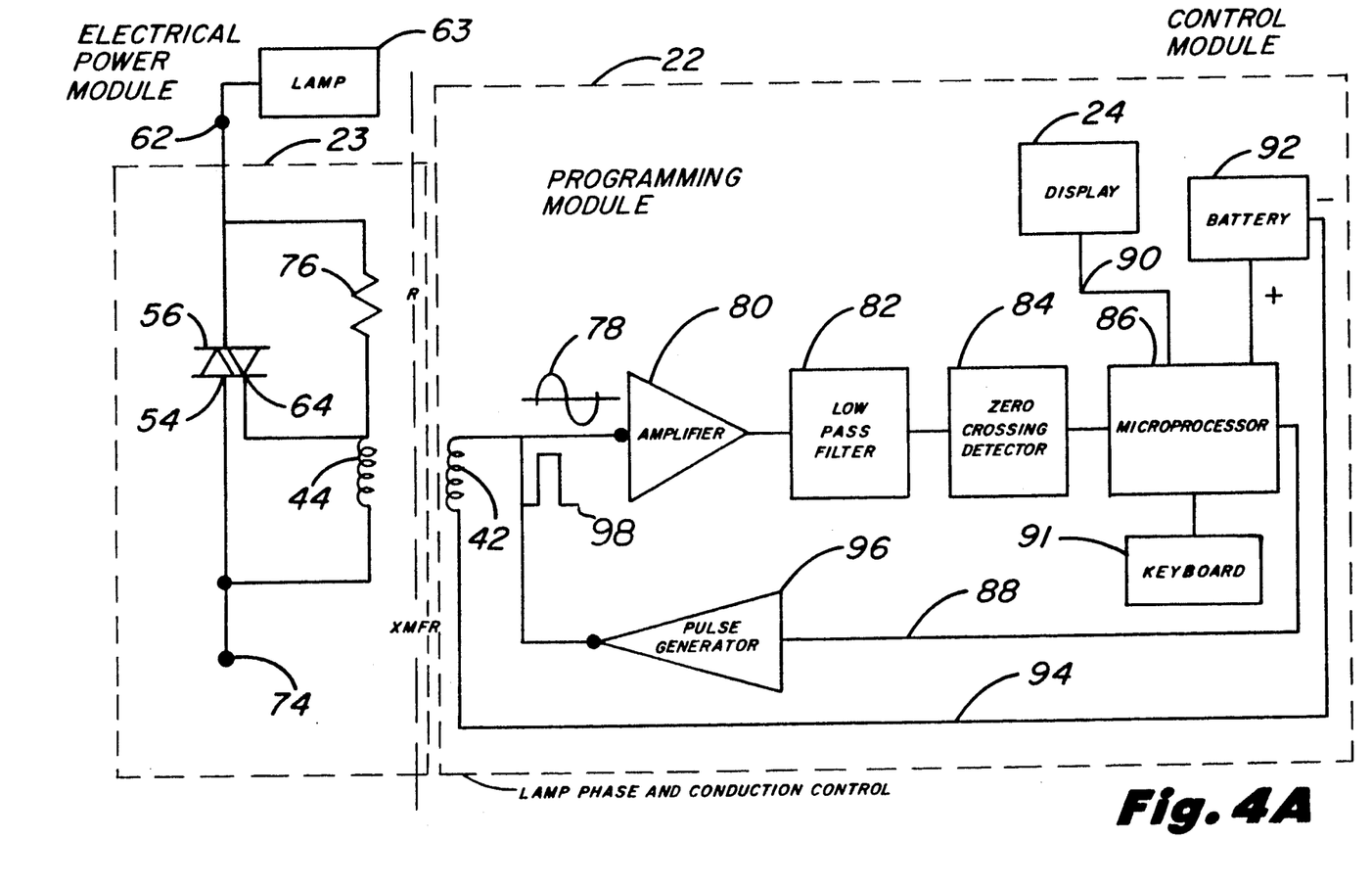
FIG. 4A is a functional block diagram showing a complete data link lamp control system according to the present invention.

For a better understanding of how the above pulse generation operation is achieved within the programmable control module 22, reference is now made to the electrical circuit diagram shown in FIG. 4A wherein the electronic circuitry of the control module 22 is represented by the dotted line enclosed functional block diagram on the right hand side of FIG. 4A and the electrical power module 23 for connection into the wall receptacle is illustrated in the schematic circuit diagram on the left hand side of the dotted line in FIG. 4A. As will be seen below, data is transferred in both directions through the primary and secondary transformer windings 42 and 44, and a series resistor 76 is connected as shown between one end of the secondary transformer winding or RF choke 44 and one side 62 of the AC line. In this manner, a very small AC line current is transformer coupled from the secondary transformer winding 44 back through the primary transformer winding 42 and is amplified by the amplifier 80, filtered by the low pass filter 82 and detected by the AC zero crossing detector 84 to synchronize the operation of the control module 22 to the AC line voltage. During this operation, the primary transformer winding 42 simply functions like an antenna to generate a small AC signal 78 which is amplified first through high input impedance amplifier stage 80 and then applied to a low pass filter network 82 to remove any high frequency noise components associated with this small AC signal.

Alternate methods (not shown) of synchronizing the control module operation with the AC line voltage include using optical or infrared emitter-detectors in close but not contacting proximity to each other, or by the use of high frequency radio transmitter/receivers, or by using an antenna mounted within the control module to sense the ambient 60 Hertz which permeates the room. The drawbacks to these alternative methods over the transformer coupled solution presented herein is that they consume large amounts of power and are much more complex and costly. It is well known that a transformer can easily achieve 99% power conversion efficiency for the bi-directional transfer of signals. In the case of the present invention, low level 60 Hertz signals are transmitted through the transformer from the power module 23 to the control module 22, and likewise, a high frequency, high power pulse is transmitted back through the transformer windings with sufficient instantaneous peak power to fire the Triac by the current developed in the secondary transformer winding 44. Another inherent advantage of using a transformer is that the turns ratio between the primary to secondary windings can be selected to allow a high impedance pulse generator 96 to drive the low impedance presented by the Triac gate electrode 64 without requiring the use of high current buffers or amplifiers. Thus, this bi-directional capability and impedance transformation is accomplished using a single low-cost unit which provides perfect electrical isolation to protect the user against any and all electrical faults.

Figure 4B:
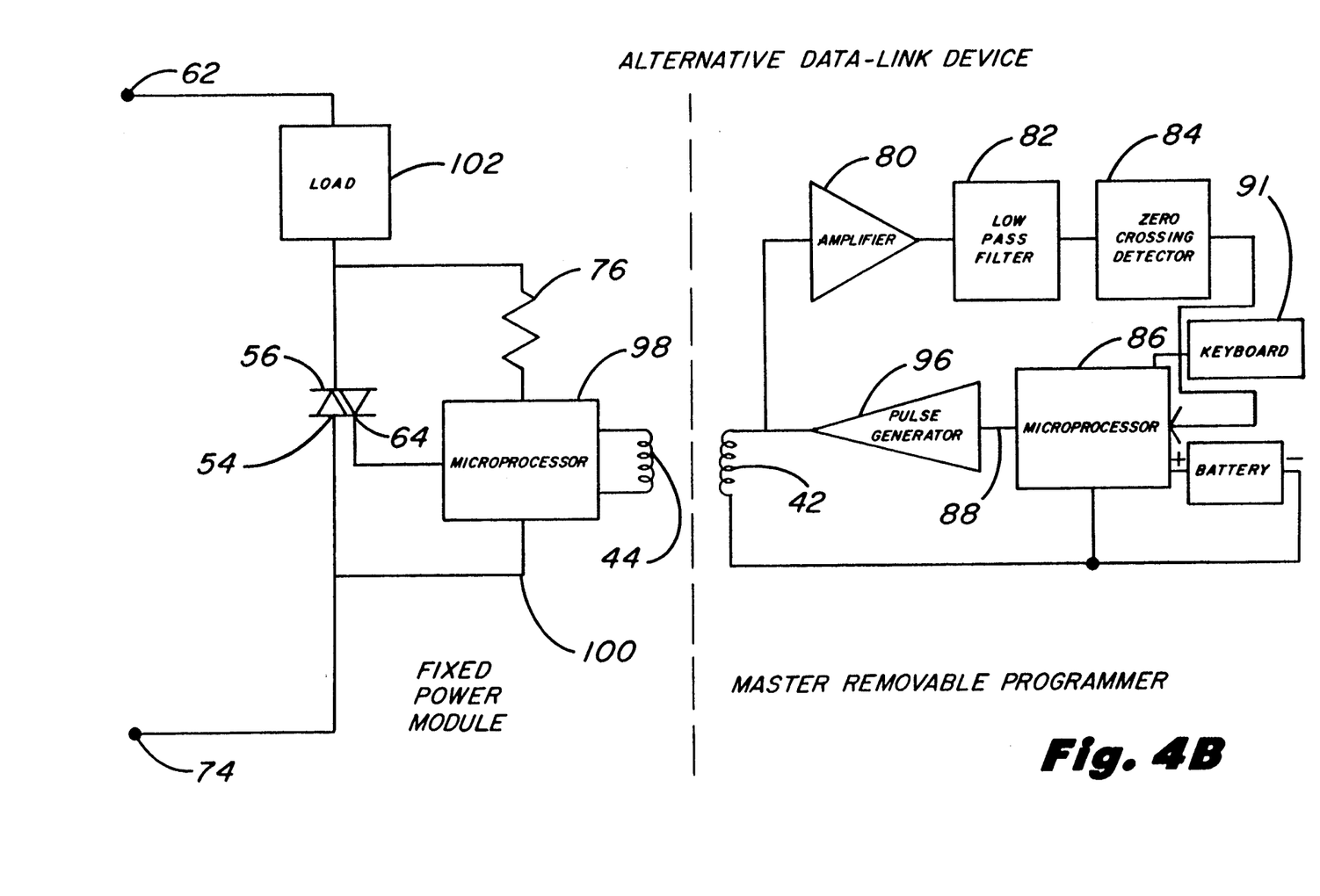
FIG. 4B is an abbreviated schematic diagram showing an alternative embodiment of the invention wherein a second microprocessor has been added between the second transformer winding of the phase control circuitry of FIG. 1 and the gate electrode of the semiconductor Triac connected therein.

Referring now to FIG. 4B, the output of the low pass filter network 82 is applied to a zero crossing detector 84 to provide a digital indication of the AC zero crossing, and the output of the zero crossing detector 84 is then applied as one input to a microprocessor 86. This feedback circuitry including stages 80, 82, and 84 operates to ensure that the output signals on output line 88 from the microprocessor are in proper phase and timing delay with the AC line voltage across terminals 62 and 74 at the electrical power module 23. Only by this method can a constant but selectively variable power be delivered to the AC load by the Triac switch 56. Also, this method allows true zero cross firing of the Triac 56 to eliminate the need for any radio interference filter components and still provide full power to the load. Also, by selecting suitable thyristor devices (not shown) to replace the Triac 56, highly inductive loads such as motors and fluorescent lamp ballasts can also be switched using the novel circuitry described herein. This feature is made possible over the known prior art, since the control module 22 is self-powered by a long life battery and does not derive any power from the AC line. All other known devices must fire the Triac 56 at less than full conduction angles in order that their internal power supplies can be recharged. For example, reference may be made to the above identified U.S. Pat. No. 5,030,890 issued to Samuel A. Johnson on Jul. 9, 1991, for details on why this technique is necessary.

The microprocessor 86 is also connected via line 90 to a display panel 24 located as described on one surface of the control module 22. A back up DC power supply 92 such as a small wrist watch type cell is connected to the microprocessor 86 to ensure that no data is lost in the microprocessor 86 during power interruptions in the AC line voltage. This DC power supply 92 can provide antenna power for both logic and display functions as well as generating the power required by the pulse generator 96, and this power supply will last greater than two (2) years in normal operation of the control module 22.

When a data value stored in the microprocessor 86 is selected manually by switching on and off the display panel control buttons 91 collectively in a predetermined timed sequence, the microprocessor 86 responds to this input data and in turn generates a corresponding and appropriate output signal on line 88 at the desired times. This signal is then applied to a pulse generator 96 connected as shown between the output of the microprocessor 88 and the primary winding 42 of the pulse transformer previously described. The pulse generator 96 operates to generate high frequency and high current output pulses 98 which are applied to the primary winding 42 of the pulse transformer and are synchronized in phase with the AC line voltage applied across terminals 62 and 74 of the electrical power module 23. Thus, the duration of these pulses 98 which are coupled into the secondary winding (RF choke 44) in the electrical power module 23 determines the phase angle or conduction time within the 360° AC cycle that the Triac 56 is conducting. This phase angle or conduction time in turn controls, for example, the illumination intensity and duty cycle of an incandescent lamp 63 connected in series with the AC line voltage terminals 62 and 74. Other functions such as lamp dimming or motor speed control can be easily accomplished by increasing the time, t, between zero cross detection 37 and Triac firing 34 as shown in FIG. 3. By keeping the primary winding pulse duration to several microseconds, conventional digital watch type batteries 92 can provide the necessary power to maintain and operate the control module logic and display and fire the Triac 120 times per second for two (2) plus years before the batteries would need to be changed.

Referring now to FIG. 4B, there is shown an alternative data link embodiment in accordance with the present invention. In this embodiment, there has been added a second microprocessor 98 which is connected as shown between the transformer secondary winding 44 and the gate electrode 64 of the semiconductor Triac 56. In addition, the second or slave microprocessor 98 is connected through the series resistor 76 to the load 102 and is further connected by way of its output conductor 100 to the other side of the AC line 74 to provide a source of rectified AC power for the microprocessor 98. Also, it is possible to program the slave microprocessor 98 to operate independently of the master unit 86 so that when operated, it will only remain on for a fixed duration of time, and then turn off. In this mode, energy savings will be realized, and the master removable programmer (not shown) for the microprocessor 98 would need to be attached if different programming instructions regarding modes of operation were desired for the slave microprocessor 98.

As in the previous case, a chosen load 102, such as an incandescent lamp, is connected in series between the Triac 56 and one side 62 of the AC line voltage. Also, as in the previous embodiment as shown in FIG. 4A, the right hand circuitry in FIG. 4B is typically provided on the printed circuit board or card 38 in FIG. 1C within the removable control module 22 which is adapted for snap fitting or press fitting directly onto the on/off switch knob 14 of a home or office wall switch. By connecting a second microprocessor 98 in the fixed power module circuitry on the left hand side of FIG. 4B, the data in the first microprocessor 86 may be down loaded by the pulse transformation process and through the transformer windings 42 and 44 into the second microprocessor 98. Various pulse code serial data formats can be used for the exchange of this data, such as RS 232, pulse width modulation and the like to transmit and error check the validity of this data. In this manner, the Triac control circuitry on the left hand side of FIG. 4B can be made to operate and respond differently to the same set or sets of on and off switching conditions which are used to manually connect and disconnect the load 102 in series with the AC line voltage at terminals 62 and 74.

Figure 5:
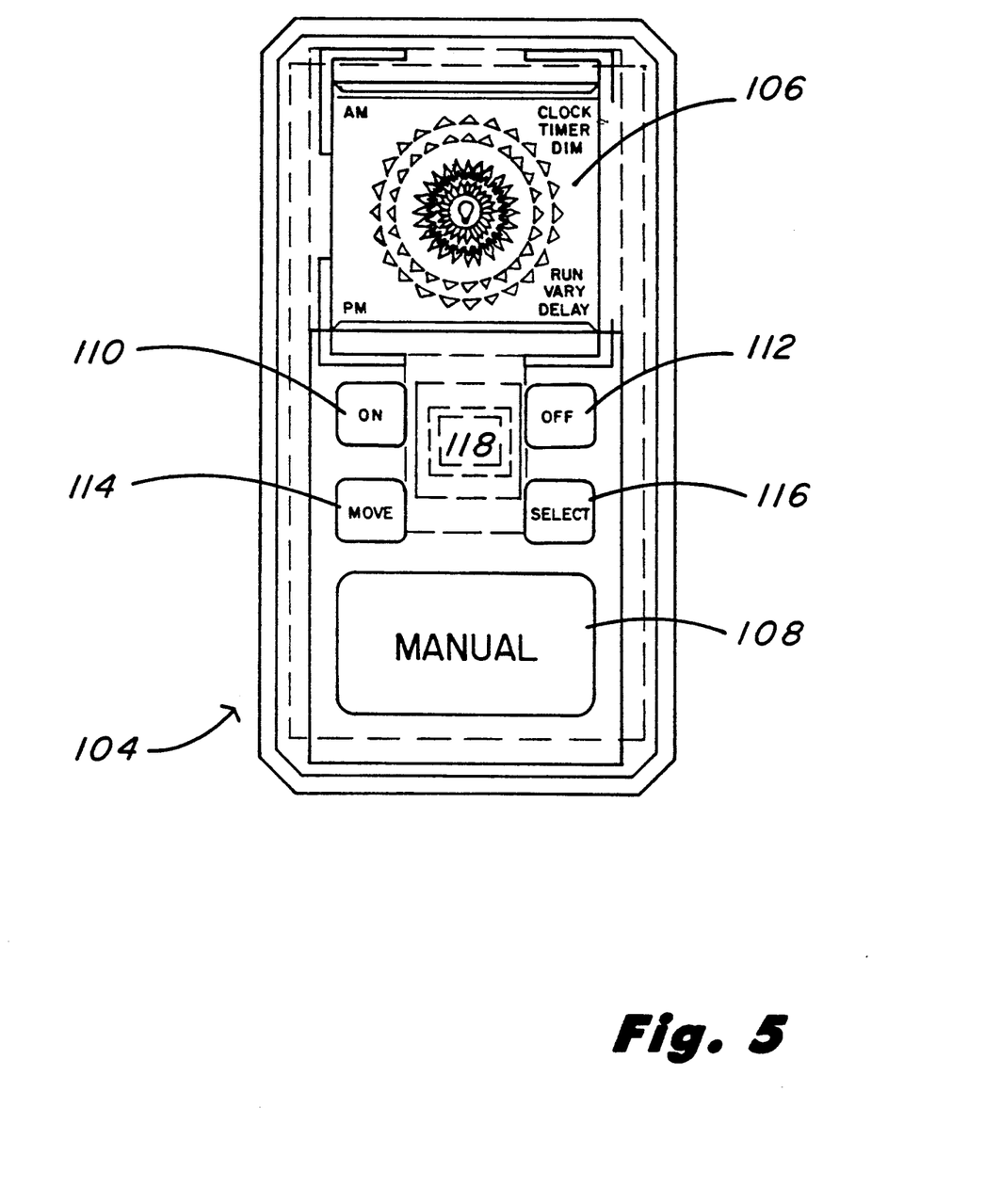
FIG. 5 shows a preferred embodiment of the display face of the control module described herein.

FIGS. 5 and 6 show a preferred embodiment for the programming and display of data. There is shown in FIG. 5 one type of keyboard 104 which has been designed to have a liquid crystal display area 106 therein described in more detail below with reference to FIGS. 6A through 6D. The keyboard 104 includes a manual control pad 108, on and off switches 110 and 112 and move and select switches 114 and 116. The keyboard design 104 in FIG. 5 differs slightly from the keyboard design shown in FIG. 1A in that liquid crystal display area 106 is provided and in addition a central area 118 is also provided in the keyboard design of FIG. 5 for the purpose of providing clearance for the switch knob 14.

Figure 6A:
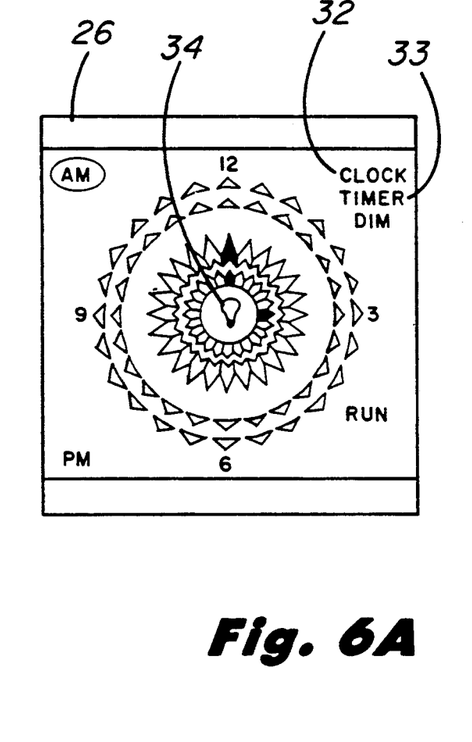
FIG. 6A through 6D are enlarged views which illustrate the operation of the clock within the display face of FIG. 5.
Figure 6B:
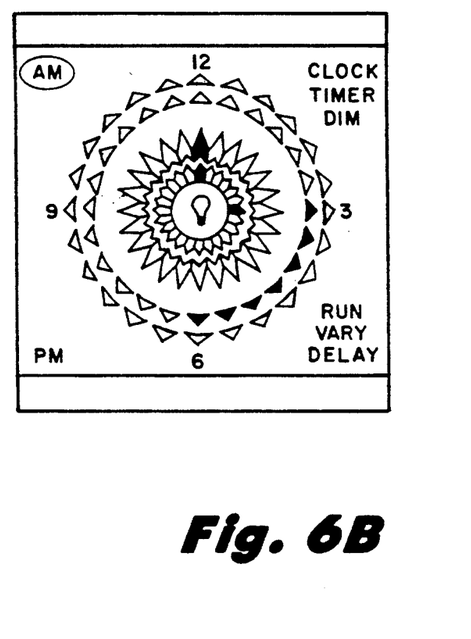

In order to program the device, the user will press the "select" button 116 in FIG. 5 until the timer liquid crystal display flag 33 is illuminated, and then he will press the "move" button 114, which will cause the active hour and minute hands to sweep through the display face in a clockwise fashion just as in the case of an analog clock. When the desired time is reached, either AM or PM, the user then presses the "On" button 110. This will cause the approximate AM or PM indicator ring segment to become active as shown in FIG. 6A. Pressing both "Move" and "On" buttons 114 and 110, respectively, simultaneously will cause the indicator rings to become and stay active as the clock hands sweep around the dial as shown in FIG. 6B.

Figure 6C:
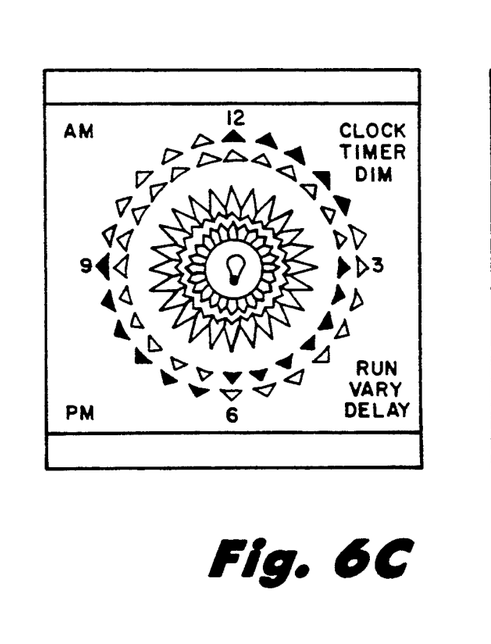
Figure 6D:
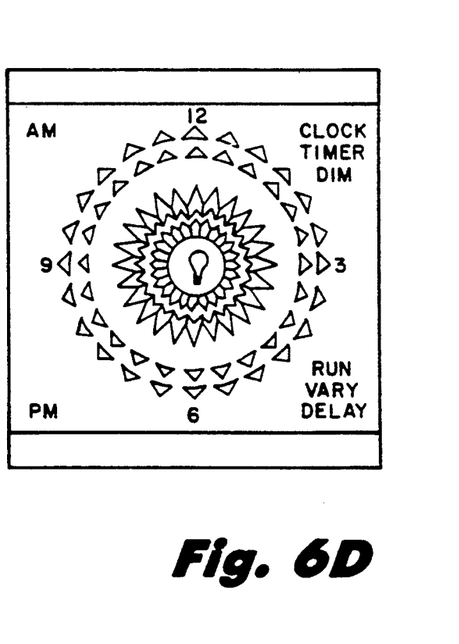

This example shows that the device has been programmed to be on from 3 AM to 6 AM. Likewise, simultaneously pressing the "Move" and "Off" buttons 114 and 112 will erase the active indicator elements after multiple on/off times are set as shown in FIG. 6C. The user may press the "Select" button 116 in FIG. 5 to increment the mode display to run, which will cause the dimmer to begin its daily programmed on/off cycle. In order to initially set the time of day clock, the "Select" mode button 116 in FIG. 5 would be pressed with the clock flag 32 illuminated. Then the user would set the time by pressing and holding the "Move" button 114 until the desired time is displayed. Pressing "Select" 116 again would exit the clock mode and store the updated clock time which would continually increment and display the actual time.

A manual button 108 is provided so that pressing this button at any time will cause the lamp to turn on either: (1) indefinitely, (2) until the "Manual" button 108 is pressed again, or (3) until a pre-set time has elapsed, at which time the light will be turned off. A indication of whether the lamp is correctly on or off is provided by the status indicator 34 being active.

Referring now to FIGS. 7A through 7C, there is shown in FIG. 7A a conventional single plug wall switch designated generally as 120, including receptacles 122 and 124 and a semi-cylindrical single or duplex ground receptacle 126. Advantageously, the semi-cylindrical ground receptacle 126 may be dedicated to receiving a special data input mating plug member 138 of a conventional wall plug fixture such as is shown in FIG. 7C. This fixture includes a semi-cylindrical prong member 128 which has been wired to receive a small primary winding 130 which may take the form of a small RF choke as previously described with reference to the earlier figures. The small RF choke or primary winding 130 is transformer coupled as shown to secondary windings 132 which are wound on a bobbin shaped core member 134. The bobbin core member 134 is preferably mounted as shown in FIG. 7B within the interior structure 136 of the wall switch as shown in the cutaway view in FIG. 7B, and the wall switch 136 in FIG. 7B is also wired to include therein the microprocessor and Triac control circuitry described above and shown schematically in FIG. 4B. The transformer winding 44 shown in FIG. 4B above now corresponds to the secondary transformer winding 132 shown in FIG. 7C.

Thus, the plug 138 in FIG. 7C may be connected to a micro-processor corresponding to the microprocessor 86 shown in FIG. 4B, and the plug 138 is used to download data from the microprocessor 86 shown in FIG. 4B and through the primary and secondary windings 130 and 132 into a microprocessor 98 shown in FIG. 4B. The microprocessor 98 is mounted within the wall switch structure 136 in FIG. 7B, but is not shown schematically in this figure. The embodiment of the invention shown in FIGS. 7A, 7B, and 7C herein provides for programming a wall plug through the data link shown in FIG. 4B, and this embodiment of the invention will prove very attractive for utility companies who would like to reduce their peak power demands during certain hours of the day. Such a wall plug can be wired into the customer's home and used to program the times during the day that a certain appliance is to remained off, thus saving peak demand.

The rate payer would also receive a rate incentive to have these devices installed in his home, and if a rate payer and utility company wanted to change the timing program, a special plug such as plug 138 described in FIG. 7C, could be inserted and a new program could be downloaded from a master controller, such as microprocessor 86 in FIG. 4B, and into the microprocessor 98 within the wall switch 120. For higher power loads, it may be necessary to replace the Triac 56 in FIG. 4B with a mechanical relay (not shown) in order to provide a greater current and power handling capability.

The embodiment shown in FIG. 7A, 7B, and 7C is characterized by a number of significant advantages which include the fact that it fits and looks like a regular wall plug and cannot be tampered with or reset by the rate payer. This fixture can be easily and safety reprogrammed and can use a modified programmer as described in FIG. 5 or can be used with a lap-top computer having a modified cable installed therewith. The location of the RF coil 130 can be used in any one of the prongs of the wall plug, but for most practical applications the ground prong having the largest available diameter would be most desirable for use. In addition, there would not be required any active conductors on the programming plug, but rather only plastic dummy prongs.

Various modifications may be made in and to the above described embodiments without departing from the spirit and scope of this invention. For example, there are many types of microprocessors which could be used to provide the data storage and generation functions of the two microprocessors 86 and 98 shown in FIGS. 4A and 4B. There are also many variations in electronic circuit design which are available to those designing the closed loop networks shown in FIG. 4A and 4B and connected between the transformer primary winding 42 and the input to the microprocessor 86. In addition, the pulse generator 96 may take one of many different available pulse generator or circuit designs, and similarly, different types of semiconductor Triacs may be used as the phase controlled AC switch 56 shown in FIGS. 4A and 4B. Furthermore, it is also possible to replace the Triac 56 shown in these figures with a completely different type of switching device such as a metal-oxide-silicon field effect transistor (MOSFET) of which there are also many different types known and available to workers in the electrical arts. Similarly, the present invention is not in any way limited to the particular module keyboard design described herein, and the novel circuit and system claims filed herewith may be utilized with many different types of keyboard and module designs.

Accordingly, it is to be understood that the above and other design modifications are clearly within the scope of the following appended claims.

I claim:

1. A data link switching system for controlling the phase angle of an AC voltage applied to an incandescent lamp which includes, in combination:
   a. a programmable module including pulse generation means therein responsive to stored data values for generating timed output pulses to a transformer primary winding connected therein, and
   b. phase control means including a wall switch having a transformer secondary winding coupled to receive said timed output pulses from said pulse generating means for controlling the conduction angle of each 360° AC waveform applied to said lamp or other equivalent load.

2. The system defined in claim 1 wherein said wall switch includes a Triac connected across a pair of output terminals and in a series connection with said lamp and having a gate electrode coupled to said pulse generation means.

3. The system defined in claim 1 wherein said primary transformer winding is located around a receptacle within a housing for said programmable module, and said secondary transformer winding is located within an on-off knob on a wall switch panel and operative to be inserted within said receptacle to thereby inductively couple said primary and secondary transformer windings.

4. The system defined in claim 1 wherein said programmable module further includes:
   a. a microprocessor connected to a DC voltage supply,
   b. detection means connected between said primary transformer winding and said microprocessor for coupling on-off data at a pair of output terminals in said phase control means to said microprocessor for selecting the data values stored therein, and
   c. said pulse generating means being connected between said microprocessor and said primary transformer winding for coupling the stored data values from said microprocessor through said primary transformer winding to said phase control means.

5. The system defined in claim 4 wherein said detection means includes:
   a. an amplifier connected to the output of said primary transformer winding,
   b. a low pass filter connected to the output of said amplifier, and
   c. a zero crossing detector connected between the output of said low pass filter and an input of said microprocessor for providing the on-off data values to said microprocessor.

6. The system defined in claim 4 wherein said programmable module includes a housing having thereon a visual display means for conveying information regarding the timing, intensity or duty cycle of said lamp.

7. The system defined in claim 4 wherein said phase control means includes a Triac connected across said pair of output terminals and in a series connection with said lamp and having a gate electrode coupled to said secondary transformer winding.

8. The system defined in claim 7 wherein said primary transformer winding is located to surround a receptacle in a programmable module housing and said secondary transformer winding is located inside an on-off knob on a wall switch pane, with said knob being operatively positioned within said receptacle of said programmable module housing.

9. The system defined in claim 8 wherein said detection means includes:
   a. an amplifier connected to the output of said primary transformer winding,
   b. a low pass filter connected to the output of said amplifier, and
   c. a zero crossing detector connected between the output of said low pass filter and one input to said microprocessor for providing the on-off data selection signals to said microprocessor.

10. The system defined in claim 1 wherein said programmable module housing has a visual display means thereon indicating the intensity, timing, or duty-cycle control of said lamp.

11. A control module operative for being inductively and removably coupled to control power to a load by varying the phase or current conduction angle that a connected AC line voltage is supplying current to the load, comprising:
   a. a module housing having a display and switch panel on one surface thereof and a switch knob receptacle on another surface thereof,
   b. data storage means within said module housing, and
   c. pulse transformation means connected between said data storage means and a primary transformer winding located within said switch knob receptacle for inductively coupling phase angle control data to said load, whereby said control module may be easily moved from wall switch to wall switch within the home or office.

12. The control module defined in claim 11 wherein said primary transformer winding is located around inner housing walls of said module housing which defines said receptacle.

13. The control module defined in claim 11 wherein said data storage means includes a microprocessor whose operation is synchronized with the AC line voltage connected to said load.

14. The control module defined in claim 12 wherein said primary transformer winding is located around said inner housing walls defining said receptacle.

15. The control module defined in claim 13 wherein said microprocessor is connected at one input terminal to received AC power interruptions through said primary transformer winding and is operative to select stored data values in response thereto and is connected at one output terminal to said pulse transformation means.

16. The control module defined in claim 15 wherein said pulse transformation means includes a pulse generator connected between said one output terminal of said microprocessor and said primary transformer winding.

17. Circuitry for controlling the conduction angle of AC current to a selected load comprising:
   a. a Triac having output electrodes connectable in series with the load and between a pair of AC supply voltage terminals,
   b. a microprocessor coupled to a gate electrode of said Triac for controlling the conduction time thereof, and
   c. means coupling data control signals to said microprocessor for downloading data therein which is subsequently used to control the conduction time of said Triac,
   d. said coupling means includes transformer primary and secondary windings electrically coupled to said gate electrode of said Triac, and
   e. said primary winding of said coupling means is located around a hollow bobbin within a control module and said secondary winding of said coupling means is located within an on/off switch knob of a wall switch and adapted to fit within a opening of said bobbin.

18. Circuitry for controlling the conduction angle of AC current to a selected load comprising:
   a. a Triac having output electrodes connectable in series with the load and between a pair of AC supply voltage terminals, and
   b. a transformer winding coupled to a gate or control electrode of said Triac and responsive to inductively coupled control signals applied thereto for controlling the conduction angle of said Triac,
   c. a programming module inductively coupled to said transformer, and
   d. said transformer winding is adapted for mounting within an on-off knob of a conventional wall switch and may take the form of a small RF choke coil.

19. Circuitry defined in claim 18 wherein said transformer winding is responsive to pulses applied from a programmed control module.

20. Circuitry defined in claim 18 wherein said transformer winding is responsive to pulses applied from a programmed control module, whereby said programmed control module may be transformer coupled to said transformer winding within said on-off knob of said wall switch.

21. Circuitry defined in claim 18 which further includes a microprocessor connected between said transformer winding and said gate or control electrode of said Triac and operative to receive data through said transformer winding.

* * * * *